(12) United States Patent
Croak et al.

(10) Patent No.: US 7,852,991 B1
(45) Date of Patent: Dec. 14, 2010

(54) METHOD AND APPARATUS FOR UPDATING A SPEED DIALING LIST

(75) Inventors: Marian Croak, Fair Haven, NJ (US); Hossein Eslambolchi, Los Altos Hills, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 198 days.

(21) Appl. No.: 11/292,223

(22) Filed: Nov. 30, 2005

(51) Int. Cl.
*H04M 11/04* (2006.01)

(52) U.S. Cl. .................. 379/40; 379/51; 379/100.14; 379/216.01; 379/355.05; 379/904; 455/445; 455/551

(58) Field of Classification Search ............ 379/355.01, 379/243, 904, 40, 51, 88.03, 100.14, 216.01, 379/355.05; 704/255; 455/445, 551
See application file for complete search history.

(56) References Cited

U.S. PATENT DOCUMENTS

| | | | | |
|---|---|---|---|---|
| 5,675,630 | A * | 10/1997 | Beatty | 455/551 |
| 5,832,429 | A * | 11/1998 | Gammel et al. | 704/255 |
| 6,052,591 | A * | 4/2000 | Bhatia | 455/445 |
| 6,243,459 | B1 * | 6/2001 | Cannon et al. | 379/356.01 |
| 6,760,431 | B1 * | 7/2004 | Haimi-Cohen | 379/355.01 |

* cited by examiner

*Primary Examiner*—Md S Elahee

(57) ABSTRACT

A method and apparatus for enabling a network service provider to compare the existing speed dial lists with new entries and only overwrite entries that have been modified are disclosed. In addition, the existing list remains active during this process and is protected from the update process. The existing list is only replaced by the updated list if the update process has been successfully completed without incident; otherwise, the existing list will remain active without being affected.

14 Claims, 4 Drawing Sheets

METHOD AND APPARATUS FOR UPDATING A SPEED DIALING LIST

The present invention relates generally to communication networks and, more particularly, to a method and apparatus for updating speed dialing lists in communication networks, e.g., packet networks such as Voice over Internet Protocol (VoIP) networks.

BACKGROUND OF THE INVENTION

Providers of voice network services, frequently allow their business subscribers to create and update speed dialing lists to facilitate reaching their frequently dialed endpoint devices. A speed dialing lists can comprise several thousand entries and is frequently updated by a subscriber. Typically when updates are made, the entire current list is first overwritten and then the modified list is submitted to replace the previous list. During this update process, if a copy of the original speed dial list that is to be modified is not kept, then this can lead to a loss of the original list and a complete speed dial service outage for the subscriber if a network or service problem occurs.

Therefore, a need exists for a method and apparatus for updating speed dialing lists in a packet network, e.g., a VoIP network.

SUMMARY OF THE INVENTION

In one embodiment, the present invention enables a network service provider to compare an existing speed dial list with new entries and only overwrite entries that have been modified. In addition, the existing list remains active during this process and is protected from the update process. The existing list is only replaced by the updated list if the update process has been successfully completed without incident; otherwise, the existing list will remain active without being affected.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
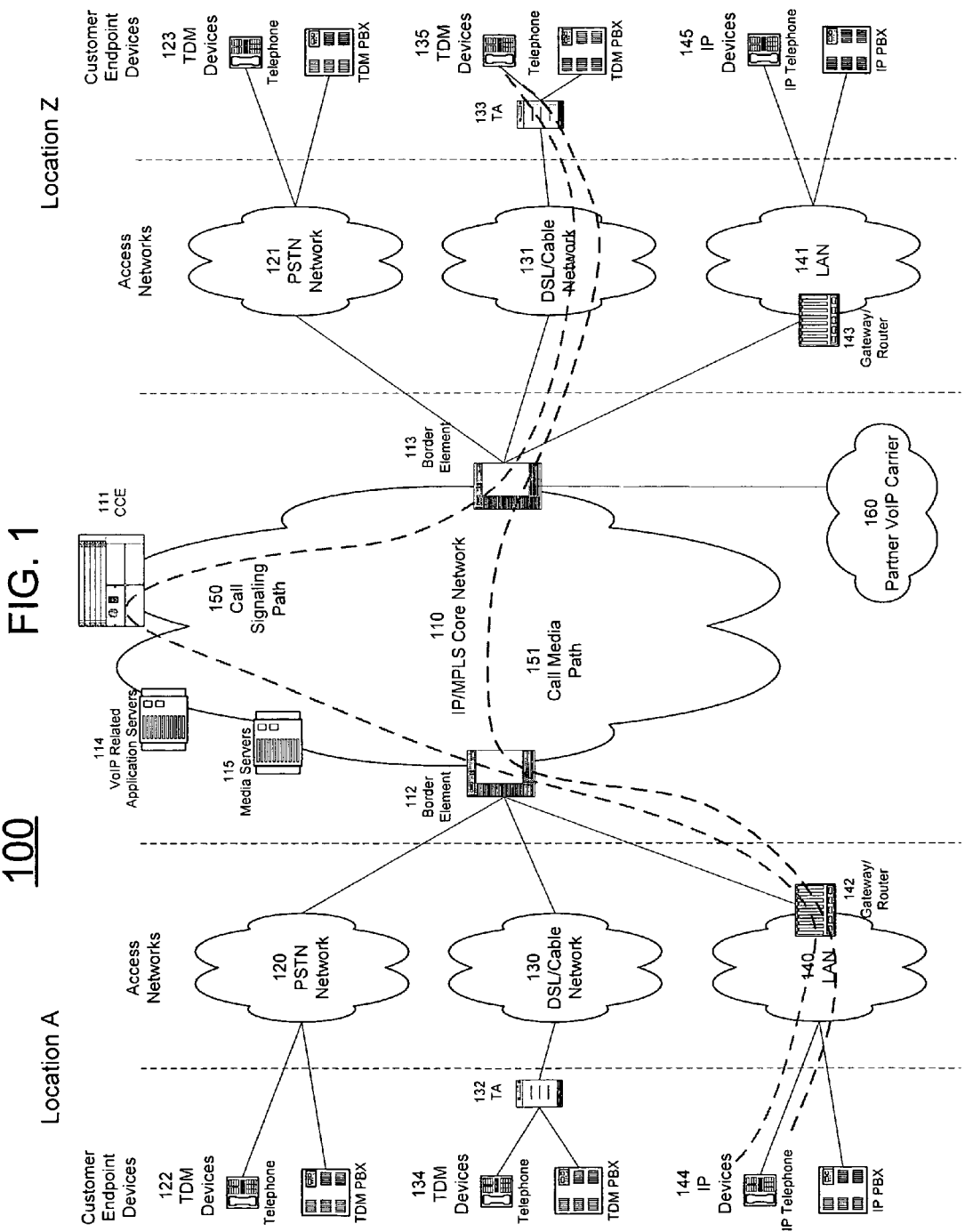
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Providers of voice network services, frequently allow their business subscribers to create and update speed dialing lists to facilitate reaching their frequently dialed endpoint devices. A speed dialing lists can comprise several thousand entries and is frequently updated by a subscriber. Typically when updates are made, the entire current list is first overwritten and then the modified list is submitted to replace the previous list. During this update process, if a copy of the original speed dial list that is to be modified is not kept, then this can lead to a loss of the original list and a complete speed dial service outage for the subscriber if a network or service problem occurs.

To address this need, the present invention enables a network service provider to compare an existing speed dial list with new entries and only overwrite entries that have been modified. In addition, the existing list remains active during this process and is protected from the update process. The existing list is only replaced by the updated list if the update process has been successfully completed without incident; otherwise, the existing list will remain active without being affected.

Figure 2:
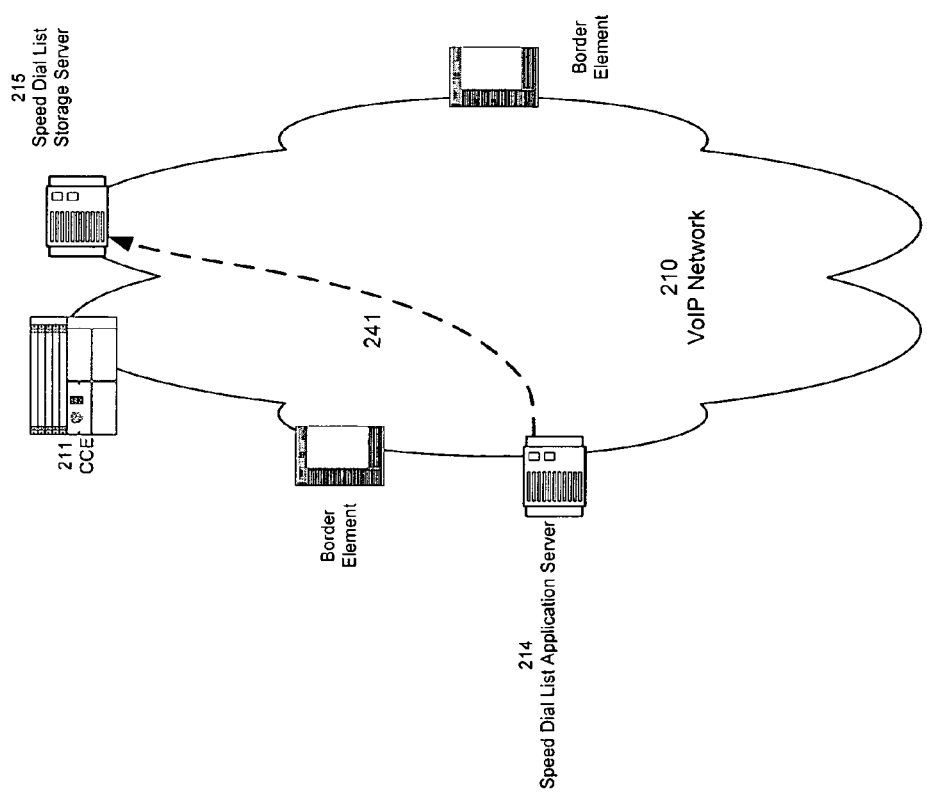
FIG. 2 illustrates an example of updating speed dialing lists in a VoIP network of the present invention.

FIG. 2 illustrates an example 200 of updating speed dialing lists in a packet network, e.g., a VoIP network of the present invention. In FIG. 2, a subscriber accesses Speed Dial List Application Server 214 to modify an existing speed dial list stored in Speed Dial List Storage Server 215. A speed dial list is a list comprising a variable number of digits speed dialing codes and the corresponding full 10 digit phone numbers associated with the individual speed dialing codes. Once the subscriber has finished inputting the updates to a particular original speed dial list, Speed Dial List Application Server 214 sends the speed dial list update request to a Speed Dial List Storage Server 215 using flow 241 for processing. Upon receiving the speed dial list update request, Speed Dial List Storage Server 215 maintains the original speed dial list in active status and in a protected mode in which the original speed dial list cannot be replaced until a modified speed dial list has been successfully created.

While in active status, the original speed dial list can be accessed by other network elements, such as CCE 211 to provide speed dialing services for the subscriber while the update is in progress. Speed Dial List Storage Server 215 identifies the changes that need to be made to the original speed dial list based on the received speed dial list updates, such as new or modified entries. Updating the original speed dial list only with the changes identified speeds up the modification process especially when the speed dial list being modified comprises a large number of entries. Speed Dial List Storage Server 215 uses a copy of the original speed dial list and modifies it only with the changes identified. Once a modified speed dial list is successfully created, the original speed dial list is then deactivated. Immediately, the modified speed dial list is activated for service.

Figure 3:
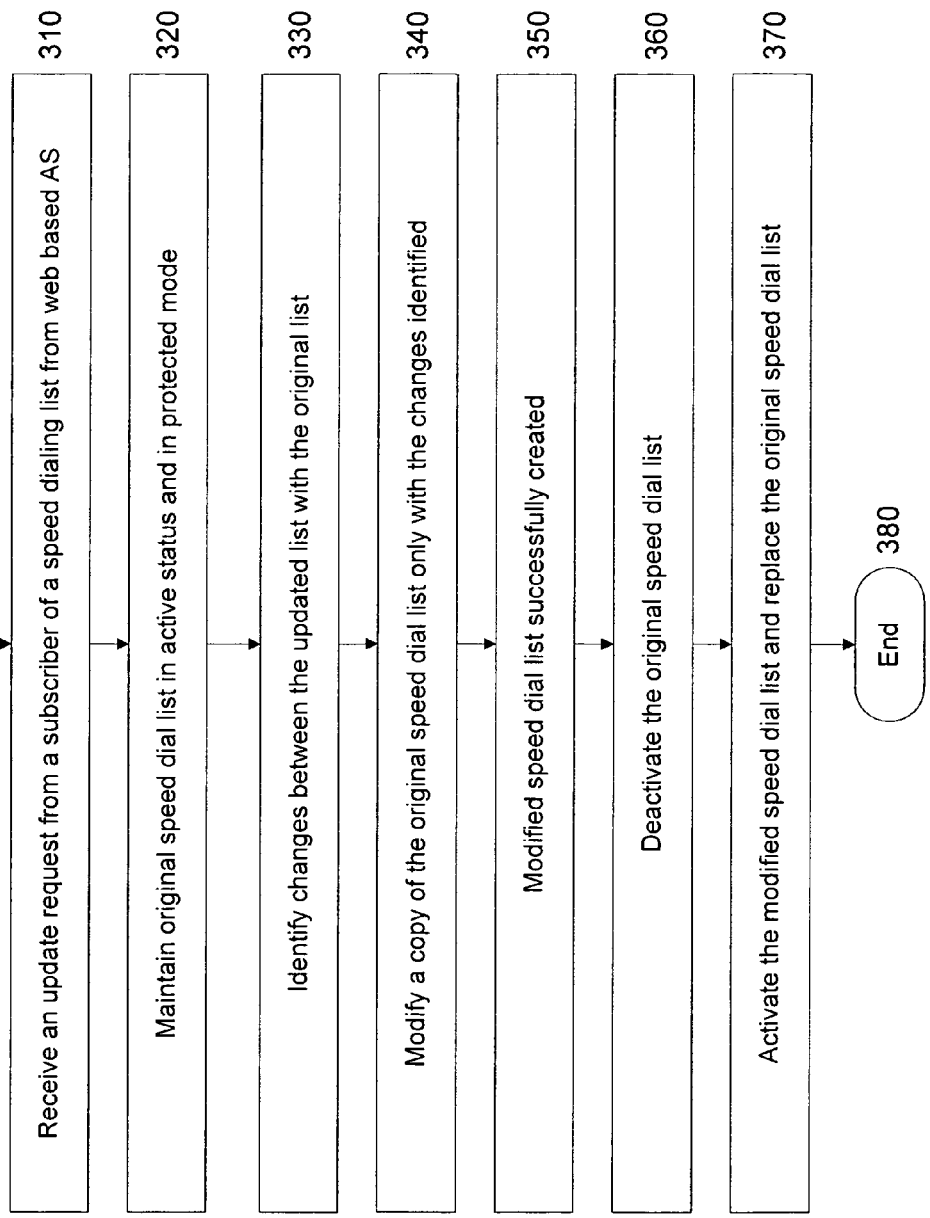
FIG. 3 illustrates a flowchart of a method for updating speed dialing lists in a packet network, e.g., a VoIP network, of the present invention.

FIG. 3 illustrates a flowchart of an exemplary method 300 for updating speed dialing lists in a packet network, e.g., a VoIP network, of the present invention. For example, method 300 can be executed by a Speed Dial List Storage Server within the VoIP network. Method 300 starts in step 305 and proceeds to step 310.

In step 310, the method receives a speed dial list update request originated by a subscriber via a Speed Dial List Application Server. The update request comprises an updated speed dial list that has been created by the subscriber.

In step 320, the method maintains the original speed dial list that is to be updated in active status and in protected mode so that it cannot be overwritten. While in active status, the original speed dial list can still be accessed by other network elements, such as a CCE to provide speed dialing services for the subscriber while the update is in progress.

In step 330, the method identifies the changes to be made to the original speed dial list based on the received speed dial list updates, such as new or modified entries. In other words, the identified changes that correspond to the differences between the original speed dial list and the updated speed dial list.

In step 340, the method uses a copy of the original speed dial list and modifies it with the identified changes. Updating the original speed dial list only with the changes identified, speeds up the modification process especially when the speed dial list being modified comprises a large number of entries.

In step 350, the method has successfully created a modified speed dial list that is to be used to replace the original active speed dial list.

In step 360, the method deactivates the original speed dial list from active service.

In step 370, the method activates the modified speed dial list into active service and replaces the original speed dial list with the modified speed dial list. The method ends in step 380.

Figure 4:
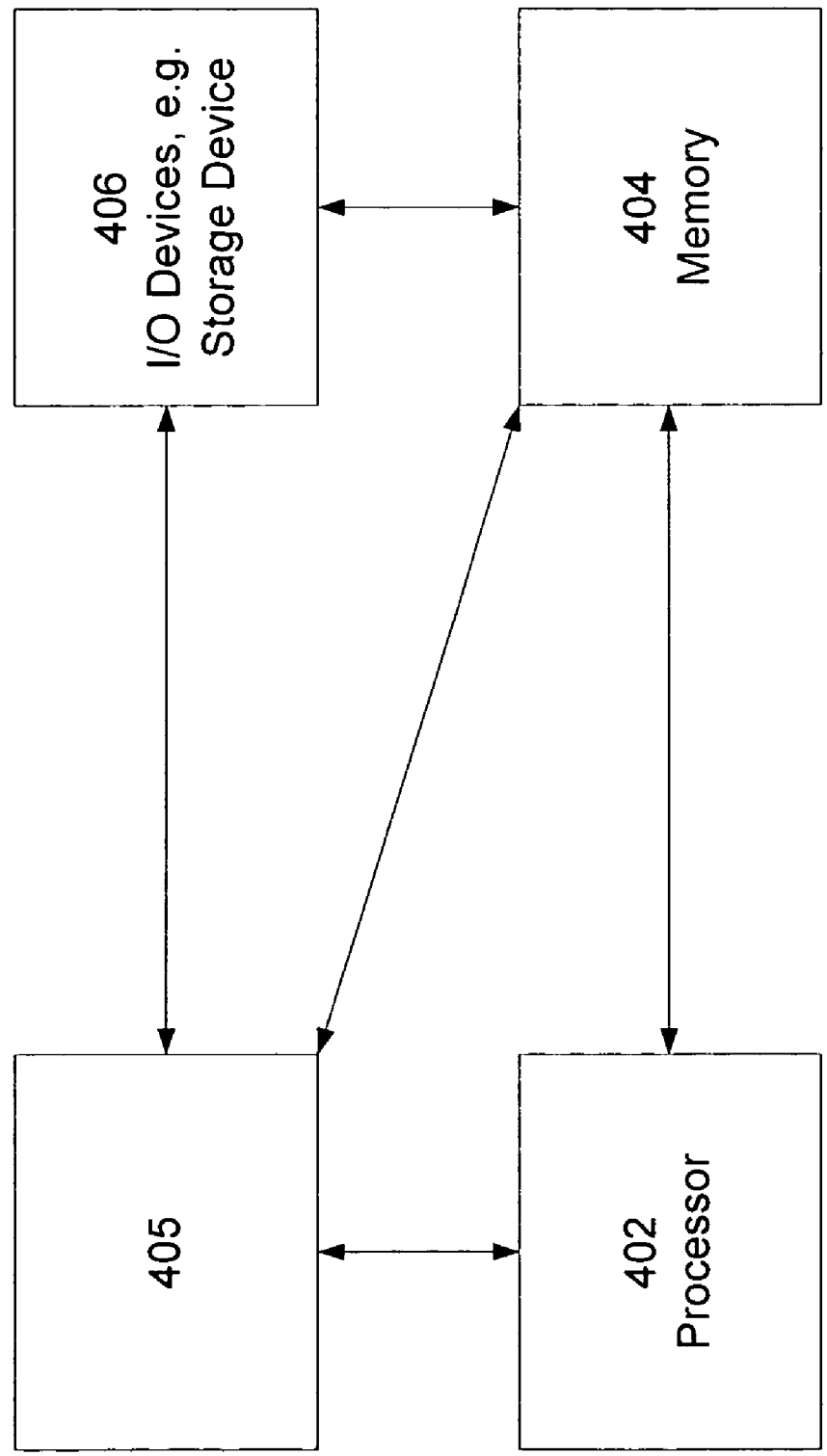
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for updating speed dialing lists, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for updating speed dialing lists can be loaded into memory 404 and executed by processor 402 to implement the functions as discussed above. As such, the present process 405 for updating speed dialing lists (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for updating a speed dialing list in a communication network, comprising:

receiving a subscriber initiated request by the communication network to update an existing speed dialing list, wherein the communication network is an internet protocol network;

identifying a change to be made to the existing speed dialing list; and updating the existing speed dialing list only if a modified speed dialing list has been successfully created in accordance with the change, wherein the existing speed dialing list and the modified speed dialing list are two separate lists, wherein the updating comprises:

creating the modified speed dialing list using a copy of the existing speed dialing list with the change;

deactivating the existing speed dialing list, while activating the modified speed dialing list; and removing the deactivated existing speed dialing list from the communication network.

2. The method of claim 1, wherein the subscriber initiated request is received by a speed dial list storage server.

3. The method of claim 2, wherein the updating the existing speed dialing list is performed by the speed dial list storage server.

4. The method of claim 1, wherein the existing speed dialing list is kept active and protected in the communication network when the modified speed dialing list is being created.

5. The method of claim 4, wherein the existing speed dialing list is accessible by a call control element when the modified speed dialing list is being created.

6. A computer-readable medium having stored thereon a plurality of instructions, the plurality of instructions including instructions which, when executed by a processor, cause the processor to perform a method for updating a speed dialing list in a communication network, comprising:

receiving a subscriber initiated request by the communication network to update an existing speed dialing list, wherein the communication network is an internet protocol network;

identifying a change to be made to the existing speed dialing list; and updating the existing speed dialing list only if a modified speed dialing list has been successfully created in accordance with the change, wherein the existing speed dialing list and the modified speed dialing list are two separate lists, wherein the updating comprises:

creating the modified speed dialing list using a copy of the existing speed dialing list with the change;

deactivating the existing speed dialing list, while activating the modified speed dialing list; and removing the deactivated existing speed dialing list from the communication network.

7. The computer-readable medium of claim 6, wherein the subscriber initiated request is received by a speed dial list storage server.

8. The computer-readable medium of claim 7, wherein the updating the existing speed dialing list is performed by the speed dial list storage server.

9. The computer-readable medium of claim 6, wherein the existing speed dialing list is kept active and protected in the communication network when the modified speed dialing list is being created.

10. The computer-readable medium of claim 9, wherein the existing speed dialing list is accessible by a call control element when the modified speed dialing list is being created.

11. An apparatus for updating a speed dialing list in a communication network, comprising:

means for receiving a subscriber initiated request by the communication network to update an existing speed dialing list, wherein the communication network is an internet protocol network;

means for identifying a change to be made to the existing speed dialing list; and means for updating the existing speed dialing list only if a modified speed dialing list has been successfully created in accordance with the change, wherein the existing speed dialing list and the modified speed dialing list are two separate lists, wherein the updating comprises:

means for creating the modified speed dialing list using a copy of the existing speed dialing list with the change;

means for deactivating the existing speed dialing list, while activating the modified speed dialing list; and means for removing the deactivated existing speed dialing list from the communication network.

12. The apparatus of claim 11, wherein the subscriber initiated request is received by a speed dial list storage server.

13. The apparatus of claim 12, wherein the updating the existing speed dialing list is performed by the speed dial list storage server.

14. The apparatus of claim 11, wherein the existing speed dialing list is kept active and protected in the communication network when the modified speed dialing list is being created.

* * * * *